US010246866B2

(12) United States Patent
Junca

(10) Patent No.: US 10,246,866 B2
(45) Date of Patent: Apr. 2, 2019

(54) TOILET FASTENING ASSEMBLY AND METHOD

(71) Applicant: Charles Hugh Junca, Sunset, LA (US)

(72) Inventor: Charles Hugh Junca, Sunset, LA (US)

(*) Notice: Subject to any disclaimer, the term of this patent is extended or adjusted under 35 U.S.C. 154(b) by 166 days.

(21) Appl. No.: 15/586,516

(22) Filed: May 4, 2017

(65) Prior Publication Data

US 2017/0321411 A1 Nov. 9, 2017

Related U.S. Application Data

(60) Provisional application No. 62/391,568, filed on May 4, 2016.

(51) Int. Cl.
*E03D 11/16* (2006.01)
*F16B 33/00* (2006.01)
*F16B 37/14* (2006.01)
*F16B 21/09* (2006.01)
*F16B 35/06* (2006.01)

(52) U.S. Cl.
CPC ............ *E03D 11/16* (2013.01); *F16B 33/006* (2013.01); *F16B 21/09* (2013.01); *F16B 35/06* (2013.01); *F16B 37/14* (2013.01); *F16B 37/145* (2013.01)

(58) Field of Classification Search
CPC .......... F16B 37/14; F16B 21/09; E03D 11/16
USPC .................................................. 411/104, 429
See application file for complete search history.

(56) References Cited

U.S. PATENT DOCUMENTS

| | | | |
|---|---|---|---|
| 2,765,017 A | 10/1956 | Robbins | |
| 3,180,660 A | 4/1965 | Brewington | |
| 3,262,590 A | 7/1966 | Lynn | |
| 3,391,905 A | 7/1968 | Burnes | |
| 3,419,298 A | 12/1968 | Worley | |
| 3,601,823 A * | 8/1971 | Isaacs | E03D 11/16 4/252.1 |
| D249,227 S * | 9/1978 | Ismert, III | D8/387 |
| D255,647 S * | 7/1980 | Ismert, III | D8/387 |
| 4,492,500 A | 1/1985 | Ewing | |
| 4,722,511 A | 2/1988 | Chitwood | |
| 4,850,063 A | 7/1989 | Abbate | |
| 4,907,923 A * | 3/1990 | McGrath, Jr. | E03D 11/14 4/252.1 |
| 5,203,065 A | 4/1993 | Peters | |
| 5,222,851 A * | 6/1993 | Dickerson | E03D 11/16 4/252.1 |
| 5,373,593 A | 12/1994 | Decky et al. | |

(Continued)

*Primary Examiner* — Flemming Saether
(74) *Attorney, Agent, or Firm* — Jones Walker LLP

(57) ABSTRACT

A toilet fastening assembly includes a fastener, a washer, and a cap. The fastener includes a base at a proximal end, a support extending from the base, and a threaded shaft extending from the support to a distal end. The base includes two flat surfaces interconnecting two curved surfaces. The support includes two flat surfaces interconnecting two tapered surfaces. The support's flat surfaces are aligned with the base's flat surfaces. The threaded shaft includes two distal tapered surfaces that are positioned perpendicular to the base's flat surfaces and the support's flat surfaces. The cap includes an outer wall defining an inner cavity and an inner cylindrical wall disposed within the inner cavity. The inner cylindrical wall's threaded inner surface receives the threaded shaft of the fastener. The inner cylindrical wall's proximal end is recessed relative to the outer wall's proximal end.

20 Claims, 5 Drawing Sheets

(56) References Cited

U.S. PATENT DOCUMENTS

| | | |
|---|---|---|
| 5,505,430 A | 4/1996 | Barnett |
| 5,556,076 A | 9/1996 | Jacquay |
| 5,897,101 A | 4/1999 | Snyder |
| 6,015,137 A | 1/2000 | Guevara et al. |
| 6,135,466 A | 10/2000 | Irwin |
| 6,254,141 B1 | 7/2001 | Piper |
| 6,367,093 B1 | 4/2002 | Hawro |
| 6,416,039 B1 | 7/2002 | Pietrusynski |
| 6,685,170 B1 | 2/2004 | Gwynn |
| 6,698,986 B2 * | 3/2004 | Fraleigh ................ E03D 11/16 411/301 |
| 6,752,379 B1 | 6/2004 | Wall |
| 6,886,192 B1 | 5/2005 | Merrill |
| 6,966,542 B2 | 11/2005 | Bettencourt |
| 7,137,615 B2 | 11/2006 | Ray et al. |
| 7,303,181 B1 | 12/2007 | Nymann |
| 7,743,435 B2 * | 6/2010 | Serret .................... E03D 11/16 4/252.1 |
| 7,798,469 B2 | 9/2010 | Junca |
| 9,033,633 B2 * | 5/2015 | Henry .................... F16B 37/14 411/429 |
| 9,051,723 B2 | 6/2015 | Junca |

* cited by examiner

TOILET FASTENING ASSEMBLY AND METHOD

CROSS REFERENCE TO RELATED APPLICATIONS

This application claims the benefit of and priority to U.S. Provisional Patent Application No. 62/391,568, filed on May 4, 2016, which is incorporated by reference herein in its entirety.

DETAILED DESCRIPTION OF SELECTED EMBODIMENTS

Toilet fastening assemblies are used with floor flanges to secure toilets to floors. One such assembly is described in U.S. Pat. No. 9,051,723 issued to Junca on Jun. 9, 2015, which is incorporated herein by reference.

Disclosed herein is a new toilet fastening assembly including a cap and a fastener. The fastener is configured to be secured within a slot of a floor flange. A base of the fastener includes two flat surfaces interconnecting two curved surfaces. The flat surfaces of the fastener's base cooperate with a slot in the floor flange to facilitate the insertion of the fasteners into the floor flange's slot. The floor flange is secured to the floor at a waste outlet. The toilet is then positioned over the floor flange such that the fastener extends through a slot in a foundation of the toilet. Distal tapered surfaces of the fastener cooperate with the toilet foundation's slot to facilitate the proper positioning of the toilet over the floor flange and waste outlet. The cap of the toilet fastening assembly is then threadedly connected to the fastener to secure the toilet to the floor. No cutting or tools are required in the process disclosed herein.

Figure 1:
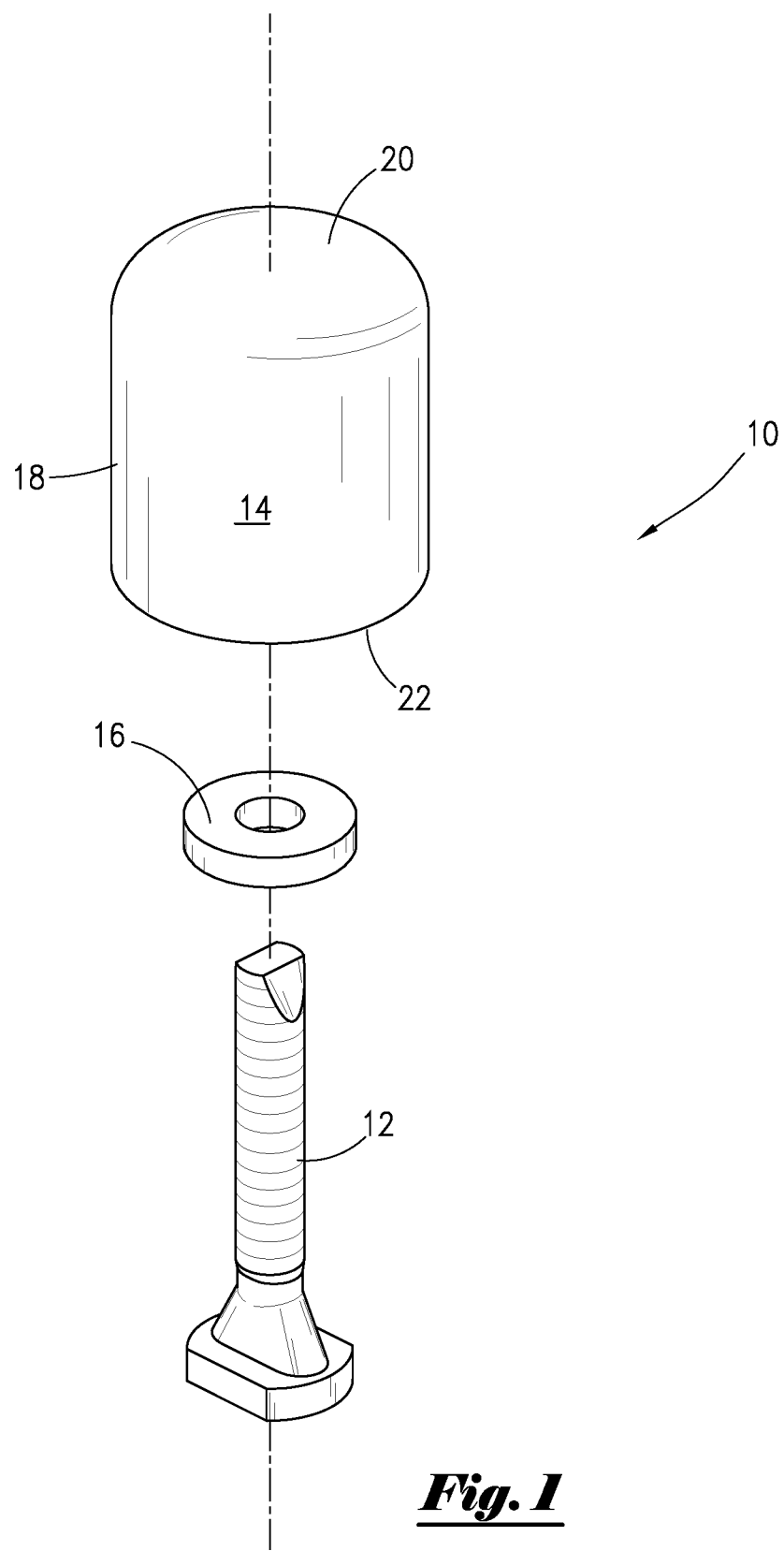
FIG. 1 is a perspective exploded view of a toilet fastening assembly.
Figure 2:
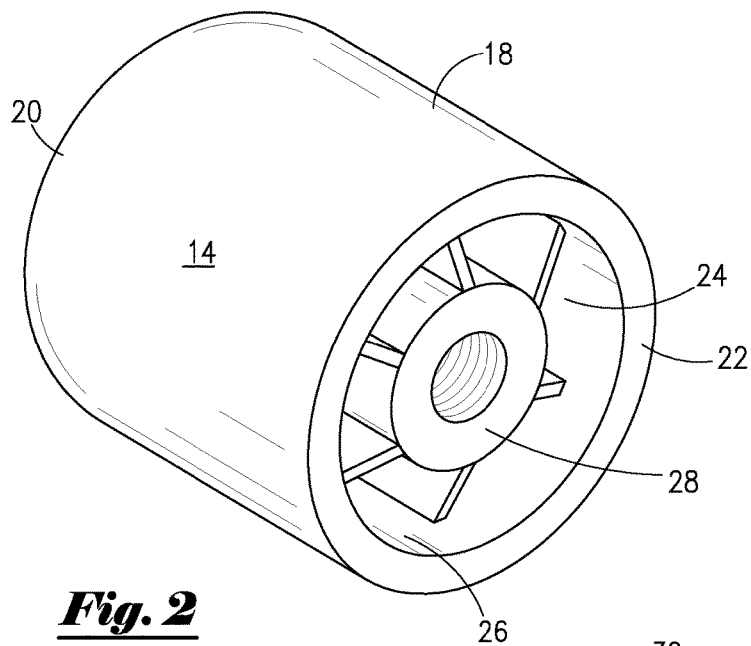
FIG. 2 is a perspective view of a cap of the toilet fastening assembly.
Figure 3:
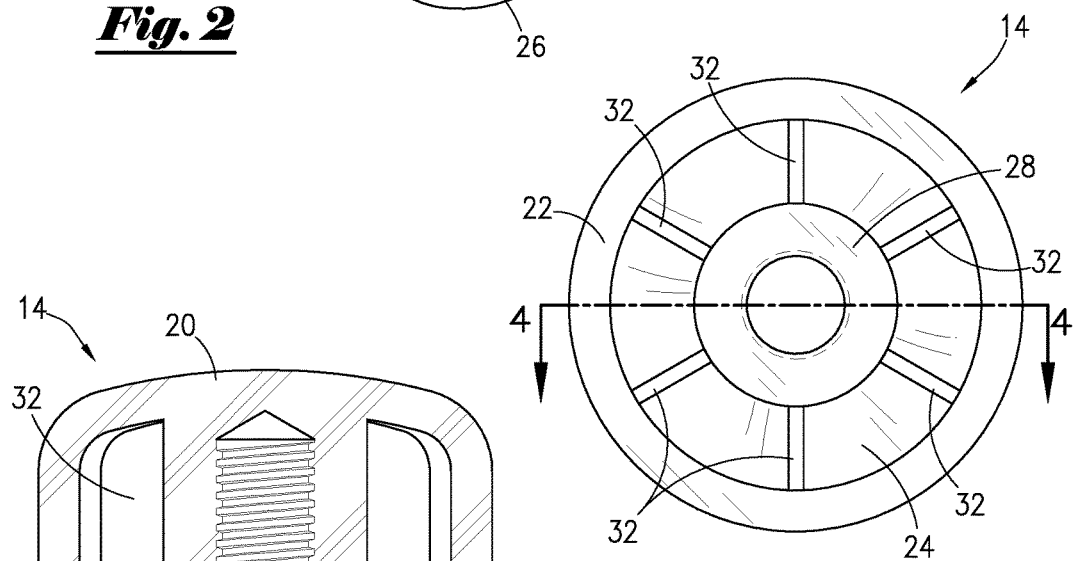
FIG. 3 is an end view of the cap.

With reference to FIG. 1, toilet fastening assembly 10 includes fastener 12 and cap 14. Toilet fastening assembly 10 may further include washer 16. In certain embodiments, such as the embodiment shown in FIG. 1, washer 16 may be formed separately from fastener 12. In other embodiments, washer 16 may be formed integrally with fastener 12.

Referring now to FIGS. 1-4, cap 14 may include outer wall 18 extending from distal gripping end 20 to proximal end 22. Outer wall 18 may form inner cavity 24 extending from proximal opening 26 at proximal end 22. In one embodiment, outer wall 18 is generally dome shaped.

Cap 14 may further include inner cylindrical wall 28 extending from distal gripping end 20 into inner cavity 24. Inner cylindrical wall 28 may include threaded inner surface 30. One or more supports 32 may be disposed within inner cavity 24 to interconnect outer wall 18 and an outer surface of inner cylindrical wall 28. Each support 32 may have tapered proximal end 33. Proximal end 34 of inner cylindrical wall 28 may be recessed by distance D relative to proximal end 22 of outer wall 18. In certain embodiments, distance D may be between 1 inch and 1/32 inch, or any subrange therein. For example, distance D may be 1/32 inch, 1/16 inch, 1/8 inch, 1/4 inch, 1/2 inch, or 1 inch. Cap 14 may be formed of a plastic material having a high hardness value (e.g., a high impact plastic).

Figure 5:
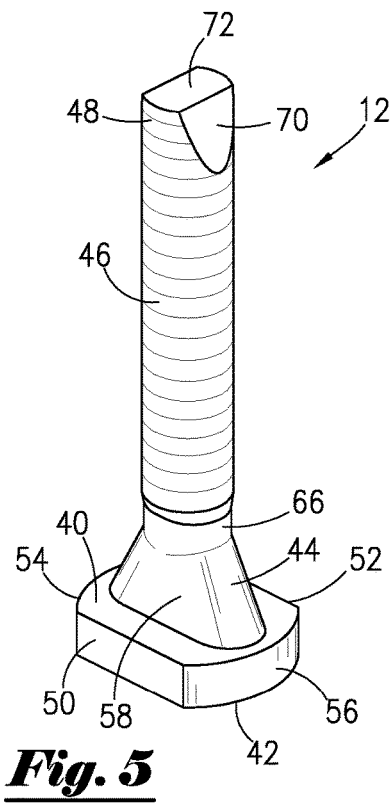
FIG. 5 is a perspective view of a fastener of the toilet fastening assembly.
Figure 6:
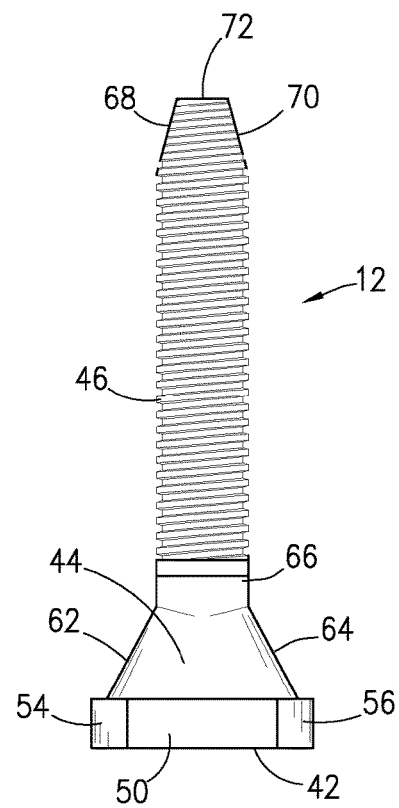
FIG. 6 is a side view of the fastener.
Figure 7:
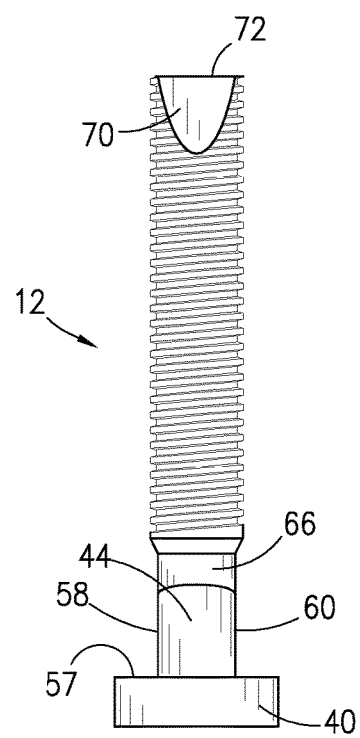
FIG. 7 is a front view of the fastener.
Figure 8:
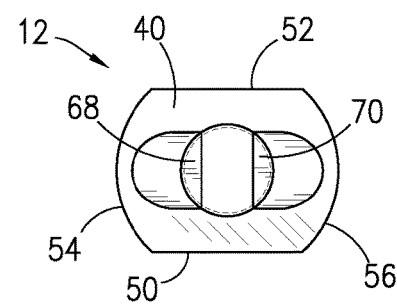
FIG. 8 is an end view of the fastener.

With reference now to FIGS. 5-8, fastener 12 includes base 40 at proximal end 42, support 44 extending from base 40, and threaded shaft 46 extending from support 44 to distal end 48 of fastener 12. Base 40 may include flat surfaces 50, 52 interconnecting curved surfaces 54, 56. Flat surfaces 50, 52 and curved surfaces 54, 56 of base 40 may be oriented in a generally longitudinal direction of fastener 12. Base 40 may also include upper surface 57 that is oriented in a generally lateral direction of fastener 12. Support 44 may include flat surfaces 58, 60 interconnecting tapered surfaces 62, 64. Flat surfaces 58, 60 of support 44 may be oriented in a generally longitudinal direction of fastener 12. Flat surfaces 58, 60 of support 44 may be aligned with flat surfaces 50, 52 of base 40, while tapered surfaces 62, 64 of support 44 may be aligned with curved surfaces 54, 56 of base 40. As used herein, aligned means to be positioned in approximately the same circumferential range about fastener 12 (as shown in FIGS. 5 and 8); in other words, a wedge shaped section extending from a central longitudinal axis of fastener 12 (along its entire length) through one component would contact the second component (i.e., the aligned components). Support 44 may further include upper portion 66 extending from flat surfaces 58, 60 and tapered surfaces 62, 64. Upper portion 66 of support 44 may have a generally round shape.

Threaded shaft 46 extends from support 44 to distal end 48. Distal end 48 includes distal tapered surfaces 68, 70. Threaded shaft 46 may have a length corresponding to the length of the threaded inner surface 30 of inner cylindrical wall 28 of cap 14. Distal tapered surfaces 68, 70 may extend only partially around the circumference of threaded shaft 46 such that the threaded surface continues to flat distal end surface 72 of fastener 12. Distal tapered surfaces 68, 70 may be positioned generally perpendicular to flat surfaces 50, 52 of base 40 and generally perpendicular to flat surfaces 58, 60 of support 44. As used herein, generally perpendicular means to not be positioned in approximately the same circumferential range about fastener 12 (as shown in FIGS. 5 and 8); in other words, a wedge shaped section extending from a central longitudinal axis of fastener 12 (along its entire length) through one component would not contact the second component. Generally perpendicular means not aligned. Fastener 12 may be formed of a plastic material having a high hardness value (e.g., a high impact plastic). In some embodiments, fastener 12 is formed of a high impact plastic with fiberglass reinforcement.

Figure 9:
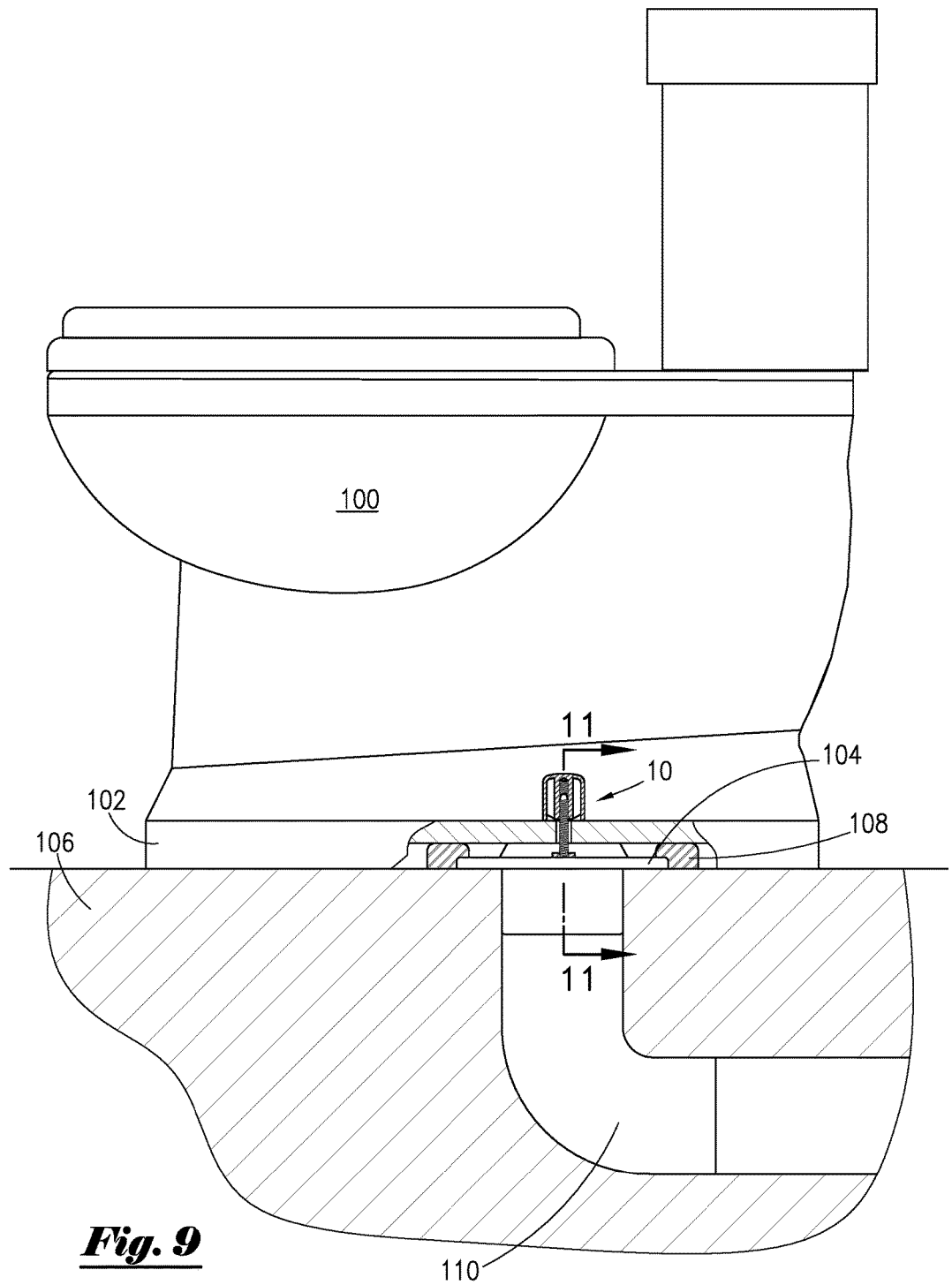
FIG. 9 is a partial cross-sectional view of the toilet fastening assembly installed on a toilet.

FIG. 9 illustrates toilet fastening assembly 10 in place with installed toilet 100. Toilet 100 includes foundation 102. Floor flange 104 is secured to floor 106, and toilet fastening assembly 10 secures foundation 102 to floor flange 104. Wax seal 108 seals around outlet 110 of toilet 100 to prevent waste from leaking as it is flushed through outlet 110.

Figure 10:
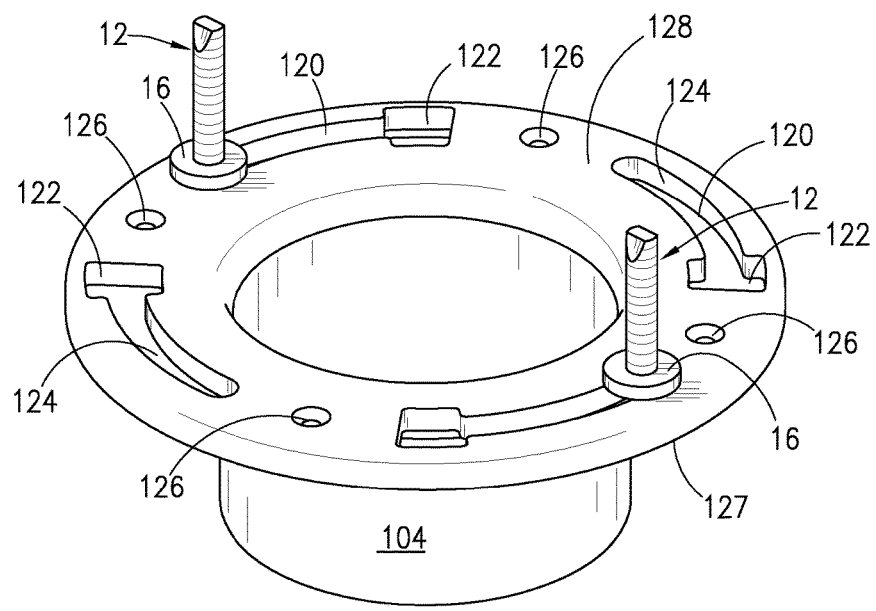
FIG. 10 is a perspective view of two fasteners of the toilet fastening assembly in place on a toilet flange.

As shown in FIG. 10, floor flange 104 may include two or more slots 120. Each slot 120 may include expanded portion 122 and linear portion 124. Floor flange 104 may further include one or more apertures 126 configured to receive a bolt, screw, or other fastening device therethrough to secure floor flange 104 to floor 106. Base 40 of each fastener 12 may be inserted through expanded section 122 of slots 120. Flat surfaces 50, 52 of base 40 and flat surfaces 58, 60 of support 44 may cooperate with slot 120 such that base 40 and support 44 fit through slot 120. Each fastener 12 may slide along linear portion 124 of slot 120. In this position, upper surface 57 of base 40 of each fastener 12 may engage lower surface 127 of floor flange 104, and flat surfaces 58, 60 of support 44 may engage side surfaces of slot 120 of floor flange 104.

Washer 16 may be disposed around fastener 12 such that a lower surface of washer 16 engages upper surface 128 of floor flange 104. Washer 16 may be disposed around threaded shaft 46 or around upper portion 66 of support 44. In certain embodiments, washer 16 may include a threaded central aperture configured to threadedly engage threaded shaft 46. In that embodiment, washer 16 may be threadedly adjusted along threaded shaft 46 to apply a force (i.e., a "jam" force) on upper surface 128 of floor flange 104. In other embodiments, washer 16 may rest upon upper surface 128 of floor flange 104 to stabilize threaded shaft 46 in the upright position as shown. Washer 16 may be formed of plastic, rubber, or any other material suitable for use with fastener 12 in this application.

Figure 11:
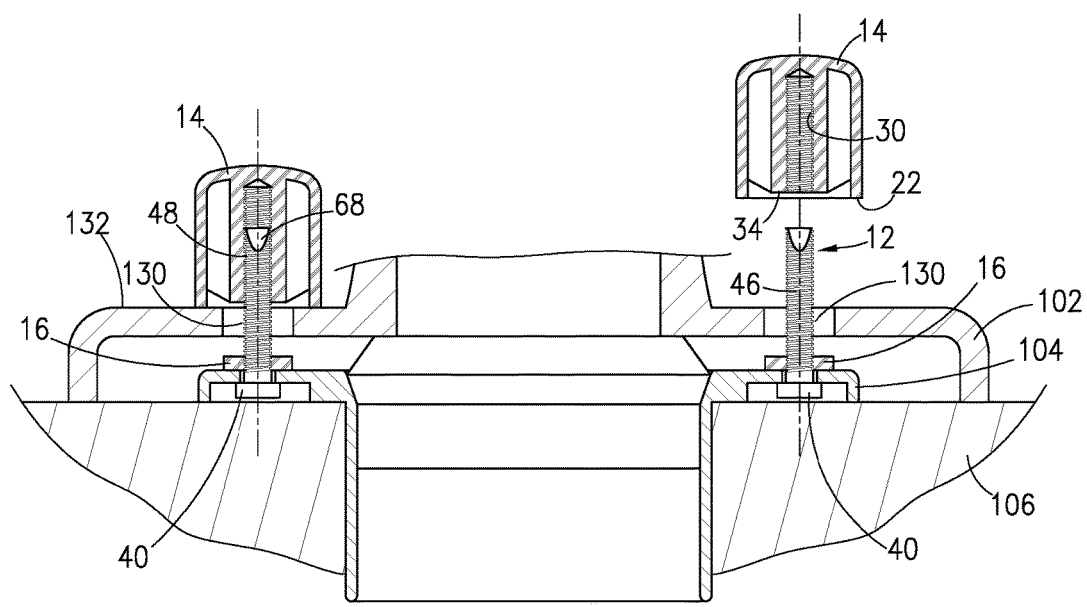
FIG. 11 is a cross-sectional view of two toilet fastener assemblies taken from line 11-11 in FIG. 9.

Referring now to FIG. 11, with two fasteners 12 secured within slots 120 of floor flange 104, floor flange 104 may be secured to floor 106 (e.g., by securing bolts through apertures 126 of floor flange 104 and into floor 106). Toilet 100 may be positioned over floor flange 104 such that fasteners 12 extend through slots 130 in foundation 102 of toilet 100. Distal tapered surfaces 68, 70 may facilitate the insertion of distal end 48 of fastener 12 through each slot 130. In this position, distal tapered surfaces 68, 70 are directed toward the forward end of toilet 100 (i.e., including the toilet bowl) and toward the rearward end of toilet 100 (i.e., including the toilet tank).

With toilet 100 in place, distal end 48 of fastener 12 may extend beyond upper surface 132 of foundation 102 of toilet 100. Cap 14 may then be positioned over fastener 12, and cap 14 may be secured to fastener 12 by engaging threaded inner surface 30 with the outer threaded surface of threaded shaft 46 of fastener 12. By rotating cap 14, the connection between cap 14 and fastener 12 may be tightened until proximal end 22 of outer wall 18 of cap 14 engages upper surface 132 of foundation 102 of toilet 100 (as shown on the left side of FIG. 11). While conventional systems require cutting a bolt down to a length accommodated by a second component, fastener 12 does not require cutting because the length of threaded shaft 46 corresponds to the length of threaded inner surface 30 of cap 14. Additionally, the length of threaded shaft 46 of fastener 12 eliminates the need for use of a separate removable alignment bolt, alignment pin, or alignment bullet as required in conventional systems. In other words, fastener 12 functions as its own alignment or insertion device (i.e., its own guide post).

Figure 4:
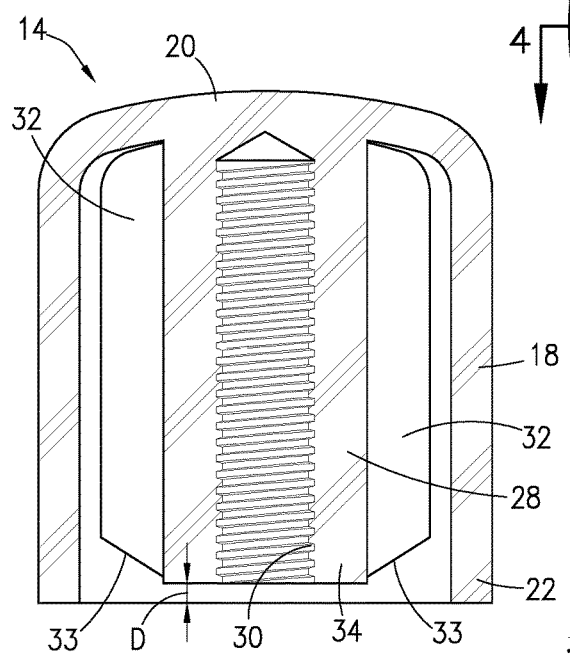
FIG. 4 is a cross-sectional view of the cap taken from line 4-4 in FIG. 3.

Because proximal end 34 of inner cylindrical wall 28 is recessed by distance D relative to proximal end 22 of outer wall 18 (as shown in FIG. 4), proximal end 34 of inner cylindrical wall 28 does not contact upper surface 132. Even when upper surface 132 is not completely level or includes other imperfections, the recessed position of proximal end 34 of inner cylindrical wall 28 ensures that inner cylindrical wall 28 does not contact upper surface 132 before proximal end 22 of outer wall 18. Accordingly, the gripping force is applied to foundation 102 of toilet 100 by outer wall 18 of cap 14 alone. In other words, outer wall 18 of cap 14 applies "jam nut" pressure to upper surface 132 of foundation 102. In this way, toilet fastening assembly 10 is used to secure toilet 100 to floor 106.

If the need arises to disconnect toilet 100 from floor 106 (e.g., maintenance, repair, or replacement of toilet 100), cap 14 may be removed by rotating to disengage threaded inner surface 30 of cap 14 from threaded shaft 46 of fastener 12. With cap 14 removed, toilet 100 may be lifted away from its position on floor 106. Fastener 12 may remain in position within slot 120 of floor flange 104. Toilet 100 or a different toilet may thereafter be positioned over floor flange 104 as described above such that threaded shaft 46 of fastener 12 extends through the slot of the toilet's foundation. Cap 14 may again be secured to fastener 12 by threadedly engaging threaded shaft 46 with threaded inner surface 30. In this way, the same toilet fastening assembly 10 may be used multiple times to secure the repeatedly secure the same toilet or different toilets to floor 106 without disconnecting floor flange 104 from floor 106.

Alternatively, after removing cap 14 and toilet 100, fastener 12 may be disconnected from floor flange 104 by sliding fastener 12 to expanded section 122 of slot 120 and lifting fastener 12 through expanded section 122. In one embodiment, floor flange 104 is disconnected from floor 106 before or after fastener 12 is removed from slot 120. The same toilet fastening assembly 10 may thereafter be used to secure a toilet to a floor in a different location.

Conventional toilet fastening systems are only able to be used once due to cutting of the bolt (which renders the bolt useless with an insufficient length and damaged threads from the cutting process). Toilet fastening assembly 10 requires no cutting and no tools for securing a toilet to a floor. Because fastener 12 is not cut, toilet fastening assembly 10 is configured for multiple uses (as described above). Toilet fastening assembly 10 may be used multiple times in the same location (i.e., with the same floor flange secured to a floor) or in separate locations.

Because fastener 12 and cap 14 are formed of a plastic material, the components of toilet fastening assembly 10 present no risk of rust or corrosion. Embodiments including fiberglass reinforced plastic provide additional strength to the components.

Each apparatus, component, system, and assembly described herein may include any combination of the described components, features, and/or functions. Each method described herein may include any combination of the described steps in any order, including the absence of certain described steps. Any range of numeric values disclosed herein shall be construed to include any subrange therein.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

I claim:

1. A toilet fastening assembly comprising:
   a fastener having a base at a proximal end, a support extending from the base, and a threaded shaft extending from the support to a distal end, the base including two flat surfaces interconnecting two curved surfaces, the support including two flat surfaces interconnecting two tapered surfaces, wherein the two flat surfaces of the support are aligned with the two flat surfaces of the base, wherein the threaded shall includes two distal tapered surfaces at the distal end, and wherein the two distal tapered surfaces are positioned perpendicular to the two flat surfaces of the base and the two flat surfaces of the support; and a cap having an outer wall extending from a proximal end to a distal gripping end, the proximal end including a proximal opening leading to an inner cavity defined by the outer wall, the cap further including an inner cylindrical wall extending from the distal gripping end to a proximal end disposed within the inner cavity, the inner cylindrical wall including an threaded inner surface configured to receive the threaded shaft of the fastener, wherein the proximal end of the inner cylindrical wall is recessed by a recess distance relative to the proximal end of the outer wall.

2. The toilet fastening assembly of claim 1, wherein the recess distance is between 1/32 inch and 1 inch.

3. The toilet fastening assembly of claim 2, wherein the recess distance is 1/8 inch or 1/16 inch.

4. The toilet fastening assembly of claim 1, wherein the distal end of the fastener includes a flat end surface.

5. The toilet fastening assembly of claim 4, wherein the support of the fastener further includes an upper portion extending from the two flat surfaces and the two tapered surfaces of the support to the threaded shaft, wherein the upper portion has a generally round shape.

6. The toilet fastening assembly of claim 5, further comprising a washer integrally formed with the upper portion of the support of the fastener.

7. The toilet fastening assembly of claim 5, further comprising a washer having a central opening dimensioned to receive the threaded shaft of the fastener therethrough.

8. The toilet fastening assembly of claim 7, wherein the central opening of the washer includes a threaded surface configured to threadedly engage the threaded shaft of the fastener.

9. The toilet fastening assembly of claim 1, wherein the cap further includes one or more supports disposed within the inner cavity and interconnecting the outer wall and an outer surface of the inner cylindrical wall.

10. The toilet fastening assembly of claim 9, wherein the one or more supports each includes a tapered proximal end.

11. A toilet fastening assembly comprising:
a fastener having a base at a proximal end, a support extending from the base, and a threaded shaft extending from the support to a distal end, the base including two flat surfaces interconnecting two curved surfaces, the support including two flat surfaces interconnecting two tapered surfaces, wherein the two flat surfaces of the support are aligned with the two flat surfaces of the base, wherein the threaded shaft includes two distal tapered surfaces at the distal end, wherein the two distal tapered surfaces axe positioned perpendicular to the two flat surfaces of the base and the two flat surfaces of the support, wherein the two flat surfaces of the base and the two flat surfaces of the support are configured to cooperate with a slot in a floor flange for a toilet, and wherein the two distal tapered surfaces of the fastener are configured to cooperate with a slot in a foundation of a toilet;
a washer having a central opening dimensioned to receive the threaded shaft of the fastener therethrough; and
a cap having an outer wall extending from a proximal end to a distal gripping end, the proximal end including a proximal opening leading to an inner cavity defined by the outer wall, the cap further including an inner cylindrical wall extending from the distal gripping end to a proximal end disposed within the inner cavity, the inner cylindrical wall including an threaded inner surface configured to receive the threaded shall of the fastener, wherein the proximal end of the inner cylindrical wall is recessed by a recess distance relative to the proximal end of the outer wall.

12. The toilet fastening assembly of claim 11, wherein the recess distance is 1/8 inch or 1/16 inch.

13. The toilet fastening assembly of claim 11, wherein the distal end of the fastener includes a flat end surface.

14. The toilet fastening assembly of claim 13, wherein the support of the fastener further includes an upper portion extending from the two flat surfaces and the two tapered surfaces of the support to the threaded shaft, wherein the upper portion has a generally round shape.

15. A method of installing a toilet comprising the steps of:
a) providing a toilet fastening assembly comprising: a fastener having a base at a proximal end, a support extending from the base, and a threaded shaft extending from the support to a distal end, the base including two flat surfaces interconnecting two curved surfaces, the support including two flat surfaces interconnecting two tapered surfaces, wherein the two flat surfaces of the support are aligned with the two flat surfaces of the base, wherein the threaded shaft includes two distal tapered surfaces at the distal end, wherein the two distal tapered surfaces are positioned perpendicular to the two flat surfaces of the base and the two flat surfaces of the support; and a cap having an outer wall extending from a proximal end to a distal gripping end, the proximal end including a proximal opening leading to an inner cavity defined by the outer wall, the cap further including an inner cylindrical wall extending from the distal gripping end to a proximal end disposed within the inner cavity, the inner cylindrical wall including an threaded inner surface configured to receive the threaded shaft of the fastener, wherein the proximal end of the inner cylindrical wall is recessed by a recess distance relative to the proximal end of the outer wall;
b) securing the fastener within a slot of a floor flange for a toilet such that the base of the fastener engages a lower surface of the floor flange, the support of the fastener engages the slot, and the threaded shaft extends beyond an upper surface of the floor flange;
c) positioning the toilet over the floor flange such that the threaded shaft of the fastener extends through a slot in a foundation of the toilet;
d) securing the cover to the threaded shaft of the fastener by threadedly engaging the threaded shaft with the threaded inner surface of the inner cylindrical wall and rotating the cap to tighten the cap on the fastener.

16. The method of claim 15, wherein in step (b) the two flat surfaces of the support and the two flat surfaces of the base facilitate the insertion of the fastener through the slot of the floor flange.

17. The method of claim 16, wherein in step (c) the distal tapered surfaces of the fastener facilitate the insertion of the threaded shaft through the slot in the foundation of the toilet.

18. The method of claim 17, wherein in step (d) the cap is tightened until the proximal end of the outer wall of the cap engages an upper surface of the foundation of the toilet, and wherein the proximal end of the inner cylindrical wall of the cap does not contact the upper surface of the foundation of the toilet.

19. The method of claim 18, wherein the toilet fastening assembly further includes a washer, and in step (b) the washer is secured to the fastener such that the washer engages the upper surface of the floor flange.

20. The method of claim 19, wherein a central opening of the washer includes a threaded surface, and step (b) further comprises tightening the washer on the threaded shaft of the fastener to apply a force on the upper surface of the floor flange.

\* \* \* \* \*